United States Patent [19]
Fuller et al.

[11] Patent Number: 6,005,920
[45] Date of Patent: *Dec. 21, 1999

[54] CALL CENTER WITH FAULT RESILIENT SERVER-SWITCH LINK

[75] Inventors: Herbert I. Fuller, Lexington; Floyd Black, Greenville, both of S.C.; Daniel J. Obudzinski, Bolingbrook, Ill.

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/775,369

[22] Filed: Jan. 3, 1997

[51] Int. Cl.$^6$ .............................. H04M 1/24; H04M 3/22
[52] U.S. Cl. .............................. 379/1; 379/265; 379/266; 379/26; 379/22
[58] Field of Search ..................... 379/265, 266, 379/309, 112, 26, 32, 34, 1, 2, 12, 22, 6

[56] References Cited

U.S. PATENT DOCUMENTS

| | | | |
|---|---|---|---|
| 4,356,546 | 10/1982 | Whiteside et al. | 364/200 |
| 4,392,199 | 7/1983 | Schmittter et al. | 364/200 |
| 4,412,281 | 10/1983 | Works | 364/200 |
| 4,421,955 | 12/1983 | Mori et al. | 364/200 |
| 4,453,215 | 6/1984 | Reid | 364/200 |
| 4,455,645 | 6/1984 | Mijioka et al. | 370/16 |
| 4,484,273 | 11/1984 | Stiffler et al. | 364/200 |
| 4,484,275 | 11/1984 | Katzman et al. | 364/200 |
| 4,819,225 | 4/1989 | Hochstein | 370/16 |
| 4,887,076 | 12/1989 | Kent et al. | 364/200 |
| 5,084,816 | 1/1992 | Boese et al. | 364/240 |
| 5,367,562 | 11/1994 | Tourbah et al. | 379/2 |
| 5,442,622 | 8/1995 | Hokari | 370/16 |
| 5,469,503 | 11/1995 | Butensky et al. | 364/200 |
| 5,499,291 | 3/1996 | Kepley | 379/265 |
| 5,515,418 | 5/1996 | Yamaguchi et al. | 379/34 |
| 5,515,429 | 5/1996 | Kawada et al. | 379/279 |
| 5,546,452 | 8/1996 | Andrews et al. | 379/219 |
| 5,555,288 | 9/1996 | Wilson et al. | 379/67 |
| 5,577,096 | 11/1996 | Kitano et al. | 379/22 |
| 5,636,341 | 6/1997 | Matsushita et al. | 364/200 |
| 5,684,789 | 11/1997 | Habeck et al. | 370/251 |
| 5,715,307 | 2/1998 | Zazzera | 379/265 |
| 5,737,316 | 4/1998 | Lee | 379/22 |
| 5,757,904 | 5/1998 | Anderson | 379/265 |

Primary Examiner—Curtis A. Kuntz
Assistant Examiner—Rexford N. Barnie
Attorney, Agent, or Firm—Anderson & Anderson, LLP

[57] ABSTRACT

A call center comprising a call routing switch, a plurality of servers, a plurality of agent stations coupled to said switch and servers and related equipment. Each of the servers is connected to the switch through a communication link. In an initial state one or more links is defined as active and one or more links is defined as standby or inactive. Upon failure of one of said active links, applications on the server to which the failed link is connected are switched to another server. A previously inactive standby link to the other server is activated. Various configurations of the call center and a method for system operation are also disclosed.

7 Claims, 4 Drawing Sheets

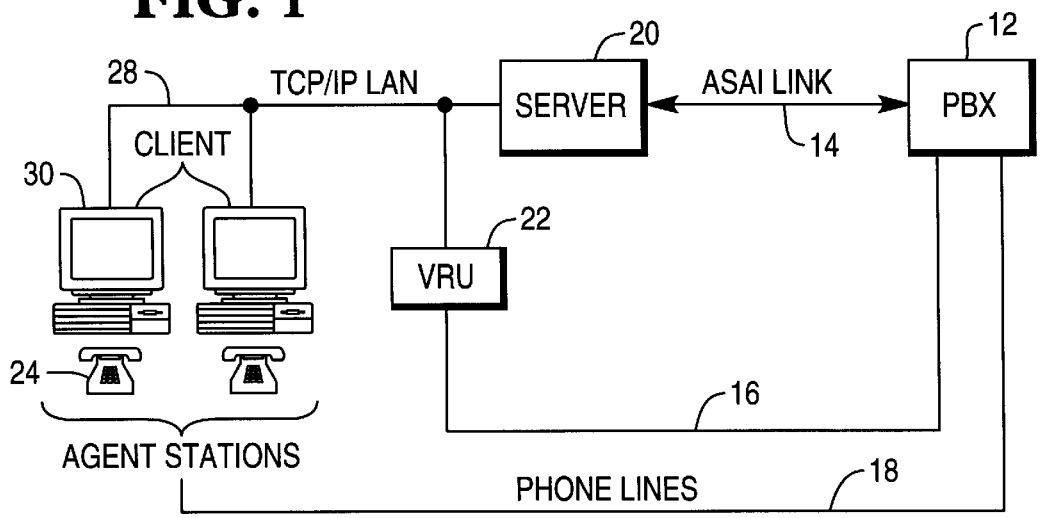
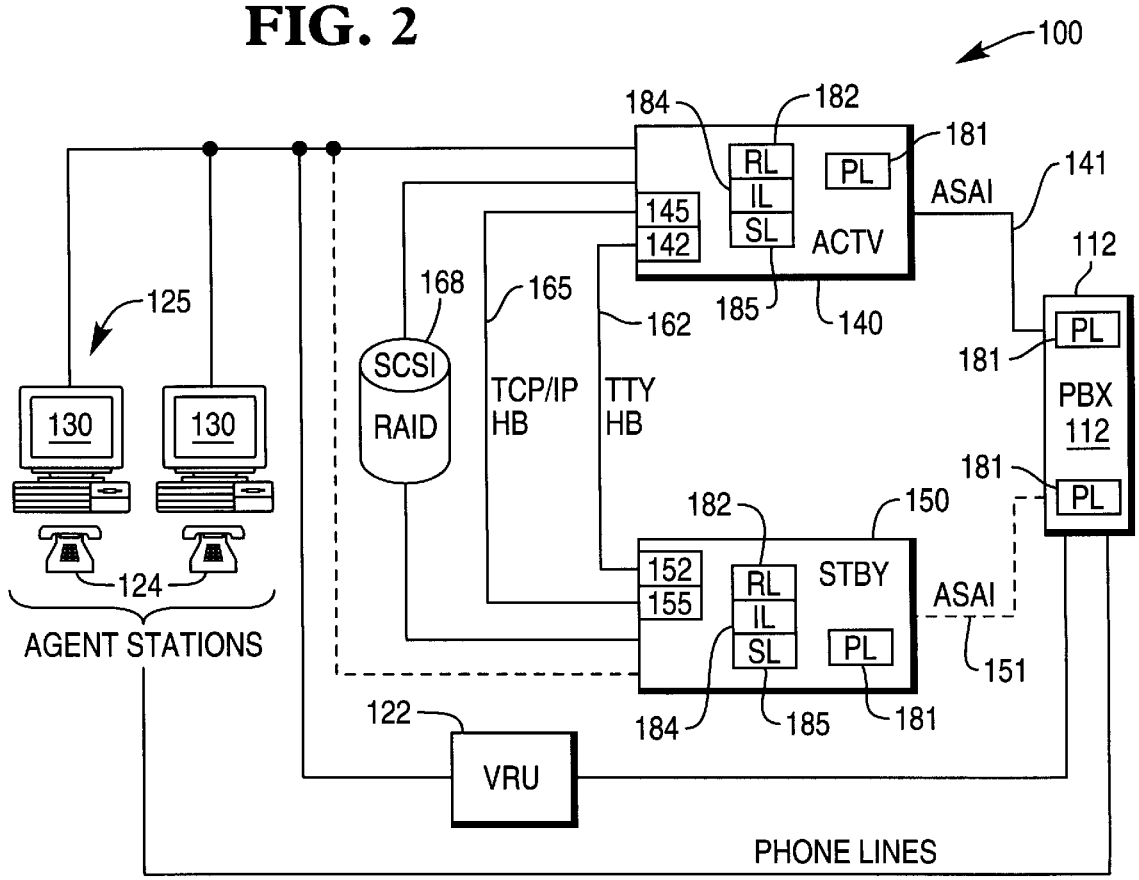

CALL CENTER WITH FAULT RESILIENT SERVER-SWITCH LINK

FIELD OF THE INVENTION

The present invention relates to call centers and more specifically to providing high integrity, fault resilient operation in a call center.

BACKGROUND OF THE INVENTION

Referring to FIG. 1, a conventional call center is shown. This center 10 includes a private branch exchange (PBX) or similar call routing switch 12 that receives incoming calls. PBX 12 is connected via a bi-directional link 14 such as an adjunct server application interface (ASAI) link to a fault tolerant computer telephony integration (CTI) server 20. PBX 12 is also connected via line 16 to a voice response unit (VRU) 22 and via phone line 18 to agent station telephones 24. The output of server 20 is propagated over a TCP/IP local area network (LAN) 28 to client computers (work stations) 30 at the agent stations.

VRU 22 enhances call processing efficiency and contains logic that prompts a caller for specific information. In response to such prompts, a caller enters data, usually through a telephone keypad, for example, pressing 2 for information on X or entering an account number followed by the pound key, etc. Responsive data may also be entered using voice recognition technology, if supported by the VRU. Server 20 acts on the entered data by sending the appropriate file over LAN 28 to one of the client computers 30 and directing the PBX switch to route the incoming call to the telephone at the agent station to which the file was sent.

To achieve high integrity in this type of call center, server 20 is often configured as a fault tolerant machine, where the term "fault tolerant" means that the machine has the ability to restore and restart operation and thus function properly even if a failure has occurred. Fault tolerance is normally achieved by providing precision components and redundancy within server 20, amongst other features. Though sufficient to achieve a desired level of integrity, this type of fault tolerant machine is disadvantageously expensive and may incorporate resources that are significantly under utilized.

In an attempt to decrease the expense of fault tolerant call centers while maintaining secure operation, fault resilient call centers have been developed which include a multiplicity of less expensive generally non-fault tolerant CTI servers arranged such that a standby server takes over for an active server that goes down.

A disadvantageous aspect of both single server fault tolerant and multiple server fault resilient call centers is that the link connection between the PBX or like switch and the server(s) is unprotected. Thus while an active server may indicate a healthy status, the call center may not function properly due to link malfunction.

SUMMARY OF THE INVENTION

Accordingly, it is an object of the present invention to provide a call center that protects server-switch communication links and provides continued operation in the event of a server-switch communication link failure.

It is another object of the present invention to provide enhanced utilization of servers in such a high integrity call center.

These and related objects of the present invention are achieved by the call center apparatus and method described herein.

In one embodiment the present invention includes a call center, comprising a call routing switch for receiving an incoming call; a first CTI server coupled to said switch by a first link; a second CTI server coupled to said switch by a second link; a plurality of agent stations coupled to said servers and switch; means in said first server for determining when said first link is not functioning properly; and means in communication with said determining means for switching operation from said first link and first server to said second link and said second server when said first link is determined to not be functioning properly. This embodiment may also include means for attempting to restart said first link when said first link is determined to not be functioning properly and means for configuring said call center such that in an initial state said first server and said first link are defined as active and said second server and said second link are defined as standby inactive.

A third CTI server coupled to said switch by a third link may also be provided in the call center. This third server and link are preferably defined as active in their initial state. Means are also preferably provided for establishing a link hierarchy.

Another embodiment of the present invention includes a call routing switch for receiving an incoming call; a first CTI server coupled to said switch by a first active link and a first inactive link; a second CTI server coupled to said switch by a second active link and a second inactive link; a plurality of agent stations coupled to said servers and switch; first determining means in said first server for determining when said first active link is not functioning properly; second determining means in said second server for determining when said second active link is not functioning properly; means in communication with said first determining means for switching operation from said first active link and first server to said second inactive link and said second server when said first active link is determined to not be functioning properly; and means in communication with said second determining means for switching operation from said second active link and second server to said first inactive link and said first server when said second active link is determined to not be functioning properly. This embodiment may further include means in communication with said first determining means for attempting to restart said first link when said first link is determined to not be functioning properly; and means in communication with said second determining means for attempting to restart said second link when said second link is determined to not be functioning properly.

A method embodiment of the present invention includes the steps of: providing a call routing switch for receiving an incoming call; providing a first CTI server coupled to said switch by a first link and a second CTI server coupled to said switch by a second link; providing a plurality of agent stations coupled to said servers and switch; determining when said first link is not functioning properly; and switching operation from said first link and first server to said second link and said second server when said first link is determined to not be functioning properly.

The attainment of the foregoing and related advantages, features and configurations of the present invention should be more readily apparent to those skilled in the art, after review of the following more detailed description of the invention taken together with the drawings.

BRIEF DESCRIPTION OF THE DRAWINGS

FIG. 1 is a block diagram of a conventional call center.

FIG. 2 is a block diagram of a call center affording link protection in accordance with the present invention.

DETAILED DESCRIPTION OF PREFERRED EMBODIMENT

Figure 3:
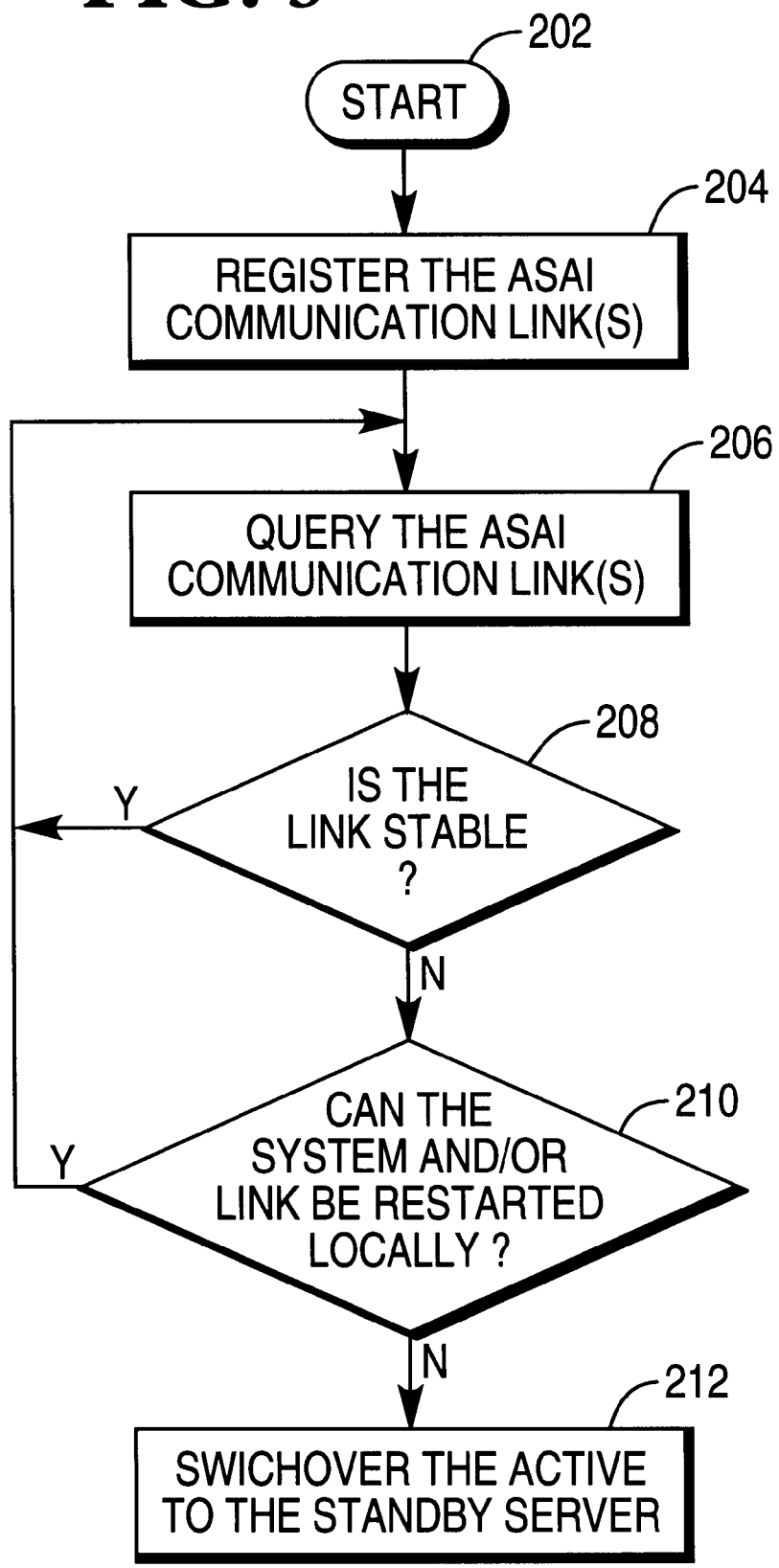
FIG. 3 is a flow diagram of link protection software operating in a call center in accordance with the present invention.

The preferred embodiments of the present invention incorporate both hardware and software aspects. The hardware aspects include a plurality of CTI servers (defined below), a plurality of ASAI ISDN or TCP/IP links, and links between the plurality of servers. The software aspects include code, preferably UNIX script files, which interfaces with conventional code in the call center servers to achieve the link protection features discussed herein. Hardware implementations are described first, followed by a description of software implementations.

Referring to FIG. 2, a block diagram of an embodiment of a call center 100 in accordance with the present invention is shown. This call center includes a PBX or like switch 112 for routing calls, a VRU 122 and a plurality of agent stations 125, each including a telephone 124 and a client computer 130. A suitable PBX 112 is the Definity Switch PBX made by Lucent Technology, Inc. The model G3v3 supports ISDN ASAI link connection, while the model G3v4 supports ISDN or Ethernet ASAI link connection. PBX 112 preferably communicates with servers 140,150 (discussed below) via ASAI links 141,151 or the like which utilize an ISDN Basic Rate Interface (BRI) communication transport or an Ethernet communication transport. The addition of a known LAN gateway system assembly or the like in PBX 112 provides the Ethernet (TCP/IP) LAN ASAI communication link capability. PBX 112 is preferably configurable for one or more (maximum of eight in the current embodiment) logical ASAI ISDN or Ethernet links in one or more physical links.

The servers 140,150 are preferably computer telephony integration (CTI) machines which are available commercially. Suitable machines include the specific models MCA and EISA of NCR Corporation, Dayton, OH. These servers contain the required software, disk storage, and adapters to support CTI enabled applications for call center platforms. Servers 140,150 are preferably connected to PBX 112 by ASAI links 141,151, which provide bi-directional communication. Link protocol logic 181 for implementing a communication protocol on these links is commercially available and includes components resident in both the servers 140, 150 and switch 112.

Server 140 is termed the "active" server and server 150 is termed the "standby" server because in the present embodiments server 140 executes call center applications while server 150 and link 151 function as a standby for server 140 and link 141, stepping in and executing call center applications when server 140 or link 141 are not functioning properly.

A communication path is established between the two servers to permit standby server 150 to investigate the status of active server 140 and to permit the transfer of necessary information to affect a switchover, amongst other functions. This communication path is termed the "heartbeat" path (in conjunction with Lifekeeper software discussed below) and preferably includes a plurality of the separate paths (to accommodate for the failure of a single path). A first of these separate communication paths is preferably a TTY RS232 serial point-to-point bi-directional link 162 through like ports 142,152 in the respective servers. Another is preferably a transport layer interface (TLI) HB using the TCP/IP protocol 165. Each of servers 140,150 includes a serial port 145,155 to support link 165. It is recommended for reliability, availability and serviceability that the LAN client computers 130 be installed on a subnet not related to link 165. Links 162,165 are preferably directly connected communication lines.

The embodiment of FIG. 2 also illustrates a shared mass storage device, such as a SCSI RAID disk array 168. Provision of this device is optional and will depend on a desired call center configuration.

With respect to software aspects, servers 140 and 150 preferably run UNIX SVR4 MP-RAS, Release 3.00.0 (Sync5) for MCA servers and UNIX SVR4 MP-RAS, Release 3.01.00 (Sync6) for MCA/EISA servers. Each server also executes a CallVisor CV3000 or like software package. CV3000 is available commercially from NCR Corporation and provides either the ISDN or Ethernet ASAI link communication interface to the PBX switch, allowing phone calls to be routed from the PBX switch to the CTI servers and vice versa.

Each server also executes Lifekeeper™ FRS software (LK) also of NCR Corporation or like software. LK as implemented herein provides ASAI, IP address, database and application resource protection. The embodiment of FIG. 2 preferably incorporates a plurality of UNIX script files (programs that are interpreted by UNIX) which interface with the LK software to form a combined fault resilient operating platform. Objectives of the combined software include registering a call center system configuration, determining when server 140 or ASAI link 141 are not functioning properly, and switching operation to server 150 and ASAI link 151 when appropriate.

The script files that assist in providing these and related functions may be further specified in that a script file is preferably provided for achieving each of the following functions:

1. determining if the ASAI link is ISDN or Ethernet (Enet);
2. determining the number of ISDN or Enet ASAI logical links and storing parameters therefor;
3. removing all Lifekeeper (LK) ISDN or Enet resources from the LK database in preparation of removing related software packages (the LK database is preferably a flat file system that contains files unique to call center database applications—information to affect a server switch over is stored in the LK database);
4. deleting ISDN or Enet resource from the LK hierarchy, where "hierarchy" is a prioritized list of resources that LK is protecting (the hierarchy starts with a "parent" directory and any "child" resources within a parent directory are moved with the parent);
5. removing an ISDN or Enet ASAI links from service (i.e., changing the link to inactive);
6. restoring an ISDN or Enet ASAI links to service (i.e., changing the link to active);
7. restarting, and if not restartable, switching over an ASAI communication link;
8. creating a hierarchy for Enet links resource on active and standby systems;
9. creating a hierarchy for ISDN links resource on active and standby systems;
10. updating ASAI link hierarchies built in LK;
11. creating a LK dependency from a parent to a child resource;

12. creating a LK instance tag name (ASCII text identifier) to identify resource presented to LK;
13. providing active and standby system menus;
14. providing ISDN or Enet choices for the parent hierarchy for the active and standby systems in the LK menu;
15. checking if a parent hierarchy exists on the system specified;
16. validating the choice of ISDN or Enet links on the LK menu and assuring that the resources exist and is in a proper state;
17. checking the validity of the standby system (i.e., that the standby ASAI links are identified and in a proper state);
18. checking if the tag name for the ISDN or Enet instance is valid on the system specified;
19. getting the tag name of the standby server;
20. getting the tag name to be used for an ISDN or Enet instance (link 141) on the active server;
21. getting the tag name to be used for an ISDN or Enet instance (link 151) on the standby server; and
22. providing 'help' on creating active and standby ISDN or Enet resources.

With respect to scripts nos. 8 and 9 for creating a hierarchy for Enet and ISDN links resources, these scripts place a desired resource under control of LK. These scripts also provide LK with a plurality of parameters (generated by scripts nos. 19–21) including the ASAI link 141 to be protected (script no. 20), the name of the standby server (script no. 19) and the ASAI link 151 that is to be activated in place of link 141 (script no. 21). LK updates the database for the active and standby machines in response to receiving the information.

A link_down script is also provided for investigation the health of the ASAI link(s) 141. When a link_down script determines that the protected link is not functioning properly script no. 7 is called to attempt a local ASAI restart, and if restarting is not successful, to initiate a switch over.

Referring to FIG. 3, a flow diagram of link protection software operating within call center (100 or another call center embodiment) in accordance with the present invention is shown.

Execution begins at step 202. Step 204 represents the registration of ASAI communication link(s) to be protected under LK. This registration entails specifying to the LK database the ASAI link(s) to be protected and the standby link(s) and server(s). This is achieved using scripts nos. 8 and 9 among others, and may be generally referred to as registration logic (RL) 182. Step 206 represent an interrogation of the ASAI communication link(s). This step is carried out by the link_down script which determines link status by investigation link protocol logic 181. Logic that carries out the interrogation step may be generally referred to as interrogation logic (IL) 184.

In step 208, a decision is made as to whether the ASAI link is stable, i.e., whether bi-directional communication tests and error status within link protocol logic 181 indicate that the ASAI link is functioning properly. If proper functioning is found, then program flow returns to step 206. If, however, proper functioning is not found, then attempts are made to restart the link locally (step 210). Techniques for restarting an Ethernet or ISDN link are known in the art. If the link cannot be restarted then, in step 212, applications on the active server are switched over to the standby server. The active server 140 and link 141 are removed by script no. 5 and the standby server 150 and link 151 are activated by script no. 6. Applications that were in progress when the link failure causing the switch over was detected may be restarted in standby server 150 (if desired by a user), which now becomes the active server. The switchover functions are generally carried out by switchover logic (SL) 185.

While the present invention may be practiced in a call center in which two servers are provided: one in an active mode and one in a standby mode, the present invention may also be practiced in other call center embodiments. Representative ones of these other embodiments are now discussed.

Figure 4:
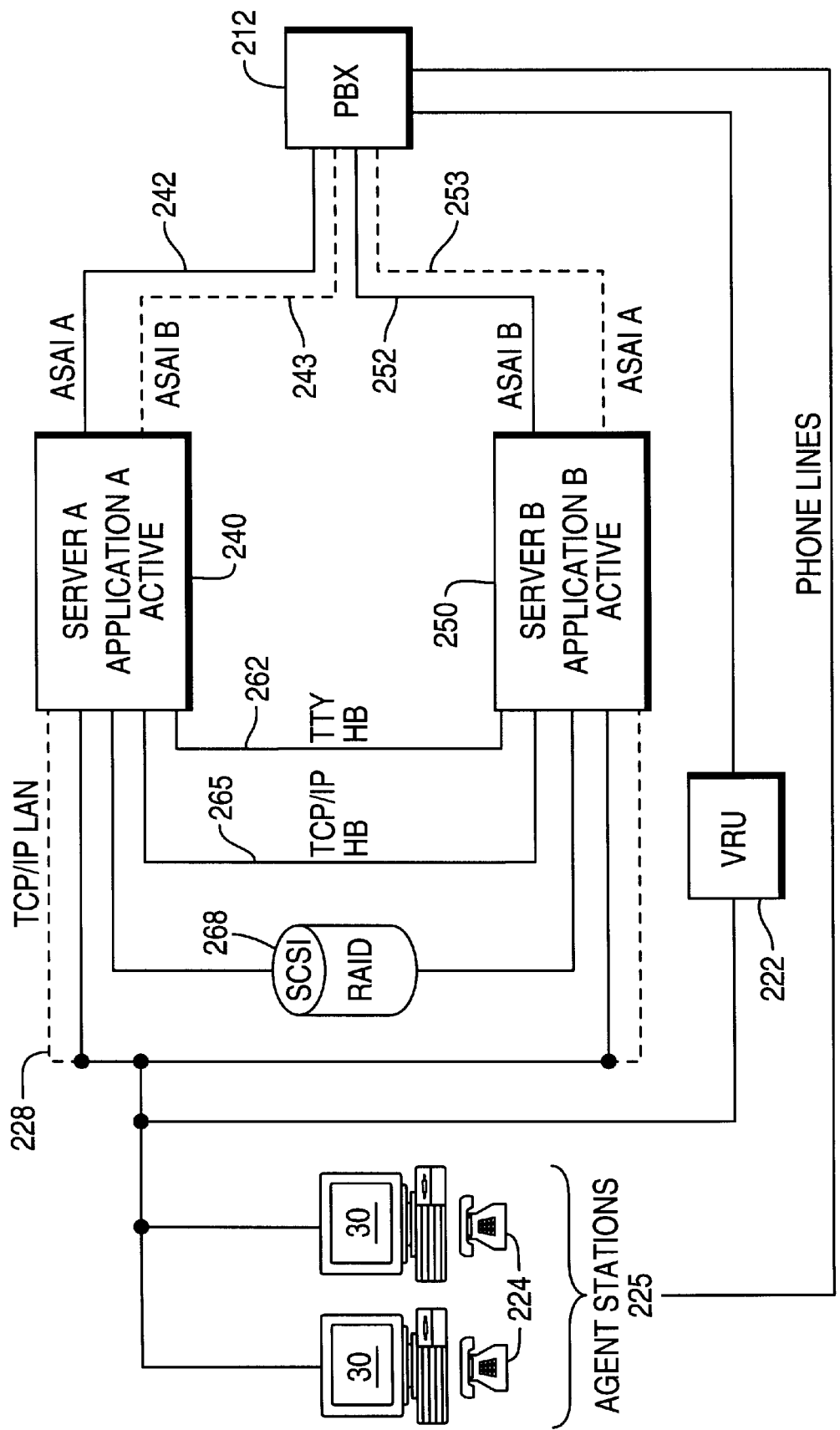
FIG. 4 is a block diagram of another call center affording link protection in accordance with the present invention.

Referring to FIG. 4, a block diagram of another embodiment of a call center 200 affording link protection in accordance with the present invention is shown. Call center 200 includes a PBX switch 212, a VRU 222, agent stations 225 (with telephones 224 and client computers 230), a mass storage device 268, LAN 228 and TCP/IP and TTY links 262,265 between two CTI servers 240,250. As opposed to being set up individually as active and standby, servers 240,250 are preferably configured such that both are active, while simultaneously being standby for one another. Links 242,252 are the active ASAI links between PBX switch 212 and servers 240,250, respectively. Links 243,253 are the inactive links.

The active links 242,252 are defined and protected using the script files described above. Upon failure of an active link, such as link 252, for example, link 252 is inactivated, link 243 is activated and applications on server 250 may be switched over to server 240.

Figure 5:
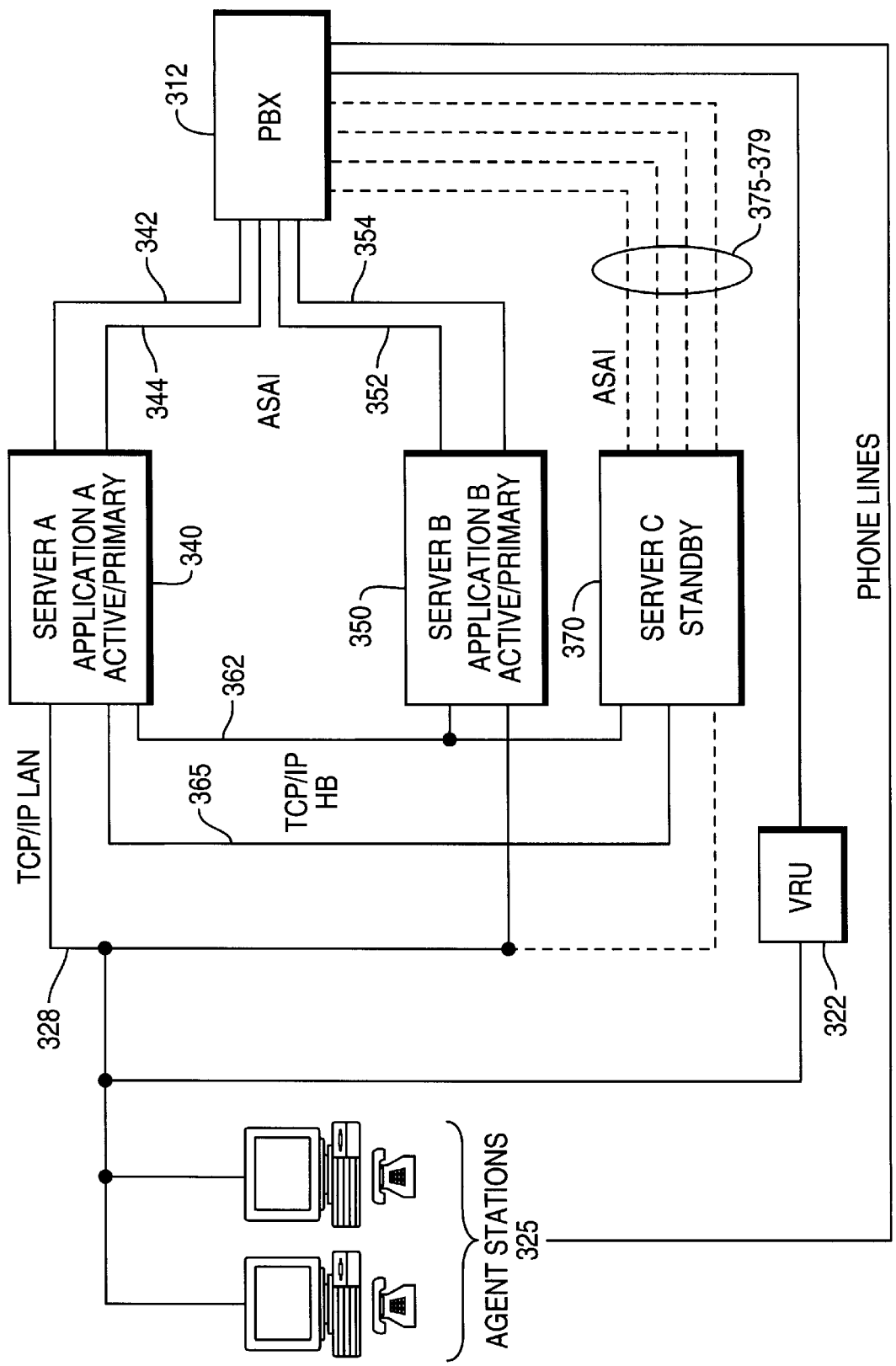
FIG. 5 is a block diagram of another call center affording link protection in accordance with the present invention.

Referring to FIG. 5, a block diagram of another embodiment of a call center 300 affording link protection in accordance with the present invention is shown. Call center 300 includes a PBX switch 312, a VRU 322, agent stations 325, LAN 328 and TCP/IP and TTY heartbeat connections as discussed above. Three (or more) servers 340,350,370 are provided. The first two (or more) servers 340,350 are configured as active servers while server 370 is configured as a standby server for server 340 and/or server 350.

ASAI links 342,344,352,354 are active links, while ASAI links 375–378 are standby or inactive links.

Links 242,243 and 252,253 and links 342,344,352,354 and 375–379 are preferably supported by link protocol logic as discussed above with reference to FIG. 2.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. An internal call center, comprising:
   at least a first CTI server and a second CTI server;
   a failover communication path between said first and second CTI servers;
   a private branch exchange (PBX) switch for receiving an incoming call;
   a first dedicated bi-directional computer telephony (CT) link that couples said first CTI server to said PBX switch;
   a second dedicated bi-directional computer telephony (CT) link that couples said second CTI server to said PBX switch, wherein said first and second CT links are respectively operated by first and second link protocol logic, and said monitoring logic includes interrogation logic in each CTI server that interrogates its corresponding link protocol logic to determine the status of its corresponding CT link;

monitoring logic within each of said first and second CTI servers that respectively monitors a status of said first and second CT links;

switchover logic that switches over CT link operation from said first CT link to said second CT link when said monitoring logic indicates that said first CT link has failed;

restart logic at least in said first CTI server that attempts to restart said first link when said monitoring logic in said first CTI server indicates that said first CT link has failed;

registration logic within at least said first CTI server that permits registration of a link hierarchy that establishes a hierarchy of which CT link(s) to switchover to in the event of a failure of said first CT link; and reconfiguration logic within said switchover logic that, in the event of a failure of said first CT link, reconfigures said link hierarchy to remove a failed first CT link and form a new hierarchy based on said second CT link.

2. The call center of claim 1, further comprising logic within at least said first CTI server that provides active and standby system CT link configuring menus, thereby providing a user with ease and flexibility in configuring said resilient call center system.

3. The call center of claim 1, further comprising a third CTI server coupled to said first and second CTI servers by said failover communication path;

a third dedicated bi-directional computer telephony (CT) link that couples said third CTI server to said PBX switch; and wherein said registration logic registers said third CT link as a failover link for at least one of said first and second links.

4. The call center of claim 1, wherein said link protocol logic implements an ASAI link protocol.

5. A resilient call center system, comprising:

a private branch exchange (PBX) switch for receiving an incoming call;

at least a first CTI server and a second CTI server;

a failover communication path between said first and second CTI servers;

a first dedicated bi-directional computer telephony (CT) link that is supported by a link protocol logic and that couples said first CTI server to said PBX switch;

a second dedicated bi-directional computer telephony (CT) link that is supported by said link protocol logic and that couples said second CTI server to said PBX switch;

determining logic in at least said first CTI server that interrogates said first link protocol logic to determine if said first CT link is not functioning properly;

switching logic in communication with said determining logic that updates said first link protocol logic and said second link protocol logic such that operation of said internal call center is switched at least in part from said first telephony link and first CTI server to said second telephony link and said second CTI server when said first telephony link is determined to not be functioning properly;

restart logic at least in said first CTI server that attempts to restart said first link when said monitoring logic in said first CTI server indicates that said first CT link has failed;

registration logic within at least said first CTI server that permits registration of a link hierarchy that establishes a hierarchy of which CT link(s) to switchover to in the event of a failure of said first CT link; and reconfiguration logic within said switchover logic that, in the event of a failure of said first CT link, reconfigures said link hierarchy to remove a failed first CT link and form a new hierarchy based on said second CT link.

6. The call center of claim 5, wherein said links are ASAI links.

7. A method of call center operation, comprising the steps of:

providing a first CTI server and a second CTI server coupled to one another;

providing a private branch exchange (PBX) switch for receiving an incoming call;

providing a first dedicated bi-directional computer telephony (CT) link that couples said first CTI server to said PBX switch;

providing a second dedicated bi-directional computer telephony (CT) link that couples said second CTI server to said PBX switch;

monitoring a status of said first and second CT links;

switching over operation from said first CT link to said second CT link when said first CT link has failed;

interrogating link protocol logic to determine the status of a corresponding one of said first and second CT links;

attempting to restart said first CT link when said first CT link is determined to not be functioning properly; and registrating a link hierarchy that establishes a hierarchy of which CT link(s) to switchover to in the event of a failure of said first CT link.

* * * * *